US012678763B2

(12) United States Patent
Blanquaert et al.

(10) Patent No.: US 12,678,763 B2
(45) Date of Patent: Jul. 14, 2026

(54) POLYMERISATION STATION FOR GRAFTING A BIOACTIVE COATING

(71) Applicant: ACTIV' BIOMAT, Roissy Aeroport Cdg (FR)

(72) Inventors: Daniel Blanquaert, Paris (FR); Amélie Leroux, Ermont (FR); Véronique Migonney, Eaubonne (FR)

(73) Assignee: ACTIV' BIOMAT, Roissy Aeroport Cdg (FR)

( * ) Notice: Subject to any disclaimer, the term of this patent is extended or adjusted under 35 U.S.C. 154(b) by 944 days.

(21) Appl. No.: 17/918,750

(22) PCT Filed: Apr. 13, 2021

(86) PCT No.: PCT/FR2021/050645
§ 371 (c)(1),
(2) Date: Nov. 7, 2022

(87) PCT Pub. No.: WO2021/209710
PCT Pub. Date: Oct. 21, 2021

(65) Prior Publication Data
US 2023/0136196 A1      May 4, 2023

(30) Foreign Application Priority Data

Apr. 14, 2020      (FR) ...................................... 2003717

(51) Int. Cl.
*C08L 51/10* (2006.01)
*B01J 19/18* (2006.01)
(Continued)

(52) U.S. Cl.
CPC ......... *B01J 19/1862* (2013.01); *C08L 51/003* (2013.01); *C08L 51/10* (2013.01);
(Continued)

(58) Field of Classification Search
None
See application file for complete search history.

(56) References Cited

U.S. PATENT DOCUMENTS

2005/0229323 A1     10/2005  Mills et al.
2006/0136057 A1*     6/2006  Brulez .................... A61L 27/18
                                                 623/13.11

FOREIGN PATENT DOCUMENTS

CN          110152508  A  *  8/2019  ............. B01D 71/80
WO      2005/003185  A1      1/2005
(Continued)

OTHER PUBLICATIONS

International Preliminary Report on Patentability (with translation of the Written Opinion) issued Oct. 13, 2022 in Application No. PCT/FR2021/050645.
(Continued)

*Primary Examiner* — Richard A. Huhn
(74) *Attorney, Agent, or Firm* — Sughrue Mion, PLLC

(57) ABSTRACT

An oxidation and grafting method for grafting a bioactive polymer, such as polyNaSS, onto an article, in particular a polymer or ceramic article. The method comprises a step of oxidation by ozonation and a step of grafting by radical polymerisation in a polymerisation station having a first reactor. The two steps of oxidation and grafting are carried out consecutively in different solutions in the reactor of the polymerisation station.

12 Claims, 1 Drawing Sheet

(51) Int. Cl.
      C08L 51/00     (2006.01)
      D06M 14/14     (2006.01)
      D06M 101/32     (2006.01)

(52) U.S. Cl.
      CPC .... D06M 14/14 (2013.01); *B01J 2219/00094*
          (2013.01); *D06M 2101/32* (2013.01); *D10B*
                      *2331/041* (2013.01)

(56)                References Cited

FOREIGN PATENT DOCUMENTS

| | | | |
|---|---|---|---|
| WO | 2011/038483 | A1 | 4/2011 |
| WO | 2017/068272 | A1 | 4/2017 |

OTHER PUBLICATIONS

International Search Report for PCT/FR2021/050645, dated Jul. 23, 2021.

\* cited by examiner

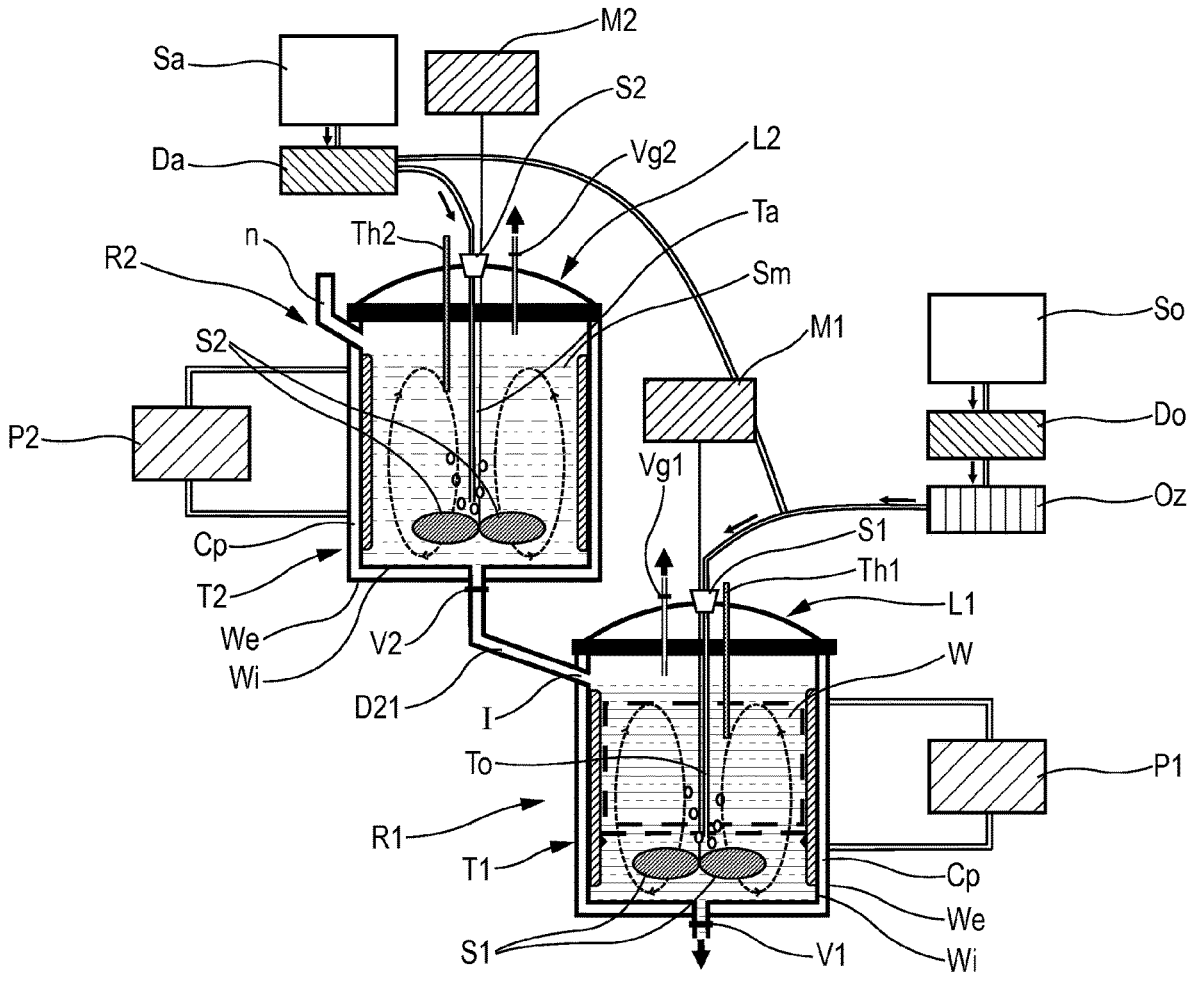

POLYMERISATION STATION FOR GRAFTING A BIOACTIVE COATING

CROSS REFERENCE TO RELATED APPLICATIONS

This application is a National Stage of International Application No. PCT/FR2021/050645 filed on Apr. 13, 2021, claiming priority based on French Patent Application No. 2003717 filed on Apr. 14, 2020.

The present invention relates to a polymerization station and to a method for grafting a bioactive polymer, such as PolyNaSS, onto an article, in particular a polymer or ceramic article. The polymerization station comprises a reactor comprising a vessel for receiving the articles for their oxidation and grafting, a cover which is mounted on the vessel in a fluid-tight manner, an inlet for at least partially filling the vessel in order to immerse the articles, and a discharge for draining the vessel.

This type of reactor is known from the prior art, in particular for carrying out small and medium scale experiments of the synthesis type in laboratories.

The objective of the invention is to carry out the oxidation and grafting on an industrial scale, i.e. in a repeatable and guaranteed manner in large quantities and at a rapid rate, which is not the case in the laboratory.

To this end, the invention proposes an oxidation and grafting method for grafting a bioactive polymer, such as PolyNaSS, onto an article, in particular a polymer or ceramic article, the method comprising a step for oxidation by ozonation and a step for grafting by radical polymerization in a polymerization station comprising a first reactor, the method being characterized in that the two steps for oxidation and grafting are carried out consecutively in different solutions in the reactor of the polymerization station.

In accordance with one embodiment of the invention, the first reactor comprises a first vessel for receiving the articles for their oxidation and grafting, a first cover which is mounted on the first vessel in a fluid-tight manner, an inlet for at least partially filling the first vessel in order to immerse the articles, a first drain outlet for draining the first vessel, an ozone inlet for bubbling ozone into the first vessel with the aim of oxidizing the surface of the articles immersed in the water, and a monomer solution inlet for at least partially filling the first vessel with monomer solution in order to immerse the articles in the monomer solution.

In accordance with a very important feature of the invention, the step for grafting by polymerization comprises preparing an aqueous solution of monomer in a second reactor of the polymerization station connected in series upstream of the first reactor in order to be able to decant the monomer solution from the second reactor into the first reactor. The two reactors may be maintained at an overpressure by injecting an inert gas such as argon. Advantageously, the step for oxidation by ozonation comprises at least partially filling the first reactor with water deriving from the second reactor.

Preferably, the first tank comprises a first double wall in a manner such as to define a peripheral circuit for circulating a heat transfer fluid, such as oil, with the aim of heating the contents of the first tank to a predetermined temperature.

In accordance with a practical embodiment, the second reactor may comprise a second vessel intended to be at least partially filled with a monomer solution, a second cover which is mounted in a fluid-tight manner on the second vessel, a second drain outlet connected to the monomer solution inlet of the first reactor in order to drain the monomer solution from the second reactor into the first reactor. Advantageously, the second vessel may comprise a second double wall in a manner such as to define a peripheral circuit for circulating a heat transfer fluid, such as oil, with the aim of heating the monomer solution of the second vessel to a predetermined temperature.

The spirit of the invention lies in the fact that the steps for oxidation and grafting are carried out in the same reactor. The use of a second reactor which is entirely dedicated to the preparation of the monomer solution makes it possible to sequence the two steps for oxidation and grafting in time, namely firstly, oxidation by ozonation and then grafting by polymerization. Preparing the monomer solution in the second reactor also makes it possible to reduce the total treatment time, given that the monomer solution can be prepared and heated to the appropriate temperature during the oxidation step. Thus, the monomer solution is brought into the first reactor under optimal "ready for use" conditions.

The invention will now be described in more detail with reference to the accompanying single FIGURE which illustrates, by way of non-limiting example, an industrial polymerization station which can be used to carry out the method of the invention.

The single FIGURE is a diagrammatic view showing an industrial polymerization station of the invention. This station comprises two reactors R1 and R2 which may be identical or similar, but which have different uses.

The first reactor R1 comprises a first vessel T1 intended to receive the articles with a view to their oxidation and their grafting. The articles are preferably polymeric or ceramic: they may, for example, be a nonwoven textile material produced from polymer fibres such as polycaprolactone, PCL. It may also be a ceramic substrate which may comprise or be constituted by tricalcium phosphate, and more particularly b tricalcium phosphate. These are merely non-limiting examples.

The first tank T1 comprises an inlet I for at least partially filling it with water or with a solution of monomer Sm in order to immerse the articles. The first tank T1 also comprises a first drain outlet (V1) for draining it of its contents, namely ozonated water or spent monomer solution, as will be described below.

The first tank T1 comprises a first double wall Wi, We, in a manner such as to define a peripheral circuit Cp for the circulation of a heat transfer fluid, such as oil, with the aim of heating the contents of the first tank T1 to a predetermined temperature. The heat transfer fluid is circulated by means of a first external pump P1 and the temperature is raised by heating means (not shown).

The first tank T1 contains a stirrer S1 which is actuated by an external motor M1. The purpose of the stirrer S1 is to mix the contents of the first tank T1.

The first reactor R1 also comprises a first cover L1 which is mounted in a fluid-tight manner on the first vessel T1. The cover L1 is removable in order to access the inside of the first vessel T1, in a manner such as to be able to place the articles to be grafted therein and to recover them once the grafting has been carried out. The first cover L1 is provided with an ozone inlet To in order to generate ozone bubbles in the first tank T1 with the aim of oxidizing the surface of the articles immersed in the water. The ozone inlet To is in the form of a tube which passes through the first cover L1 at a seal S1 and extends towards the bottom of the first tank T1. Thus, this tube makes it possible to inject ozone into the first tank T1 when it is filled (partially or completely) with water. The tube is connected via a pipe to an ozonator Oz, which in turn is connected to a dioxygen source So via a flowmeter Do. The first cover L1 is also equipped with a first thermometer Th1 and a first gas valve Vg. It should be noted that the ozone inlet To may also be connected to an inert gas source Sa (for example argon) via a flowmeter Da. The cover L1 may also enable pipes connected to an instrument for continuous measurement of the ozone level of the tank T1 to be introduced.

The second reactor R2 comprises a second vessel T2 which comprises an inlet Im for at least partially filling it with either water and monomer powder in order to create a solution of monomer Sm, or with a solution of monomer Sm. The second tank T2 also comprises a second drain outlet V2 for draining its contents, namely the ready for use monomer solution, as will be described below.

The second tank T2 comprises a second double wall Wi, We, in a manner such as to define a peripheral circuit Cp for the circulation of a heat transfer fluid, such as oil, with the aim of heating the contents of the second tank T2 to a predetermined temperature. The heat transfer fluid is circulated by means of a second external pump P2 and the temperature is raised by heating means (not shown).

The second tank T2 contains a second stirrer S2 which is actuated via a second external motor M2. The purpose of the second stirrer S2 is to dissolve the monomer powder in water in the second tank T2 in a homogeneous manner.

The second reactor R2 also comprises a second cover L2 which is mounted in a fluid-tight manner on the second vessel T2. The second cover L2 is preferably removable in order to access the interior of the second tank T2. The second cover L2 is provided with an inert gas inlet Ta. The inlet Ta is in the form of a tube which passes through the second cover L2 at a seal S2 and advantageously extends towards the bottom of the second vessel T2. Thus, this tube Ta makes it possible to inject an inert gas such as argon into the second vessel T2 when it is filled (partially or completely) with a solution of monomer Sm. The tube is connected via a pipe to the source of inert gas Sa (for example argon) via the flowmeter Da. It should be noted that the source of inert gas Sa and the flowmeter Da may be common to the two reactors R1 and R2.

In accordance with the invention, the second discharge outlet V2 from the second reactor R2 is connected in series to the inlet I of the first reactor R1 via a duct D21 in a manner such that the contents (monomer solution Sm) of the second vessel T2 can be poured or transferred into the first vessel T1. Thus, the solution of monomer Sm which is prepared and heated in the second reactor R2 may fill the first vessel T1, where it may be maintained at the same temperature, left to cool or in fact heated.

The transfer of the solution of monomer Sm preferably takes place after having emptied the ozonated water from the first tank T1. In the processing order, the surface of the articles is firstly oxidized by ozonation and then coated with bioactive polymer, such as PolyNaSS, by radical grafting. As a consequence, the articles are initially immersed in water which will be ozonated by bubbling ozone through in order to carry out the surface oxidation, and then immersed in the solution of monomer Sm deriving from the second reactor R2 in order to carry out the grafting by radical polymerization. The articles are therefore successively oxidized and grafted in one and the same reactor, namely the first reactor R1: the second reactor R2 serves only to prepare the solution of monomer Sm by mixing and heating in order to be transferred into the first tank T1 in a "ready for use" state. This therefore ensures that there will be no other substances in the reactor R2 other than water and monomer powder. In addition, the duration of the treatment is considerably reduced, given that the oxidation step and the step for preparing the solution of monomer Sm can be carried out simultaneously and that it is the solution Sm which is transferred to come into contact with the articles, and not vice versa.

Furthermore, it is advisable to maintain the first reactor R1, and advantageously also the second reactor R2, at a slight overpressure by injection of an inert gas such as argon by means of the source Sa and the tubes To and Ta.

In addition, the water may be introduced into the first reactor R1 by any means and preferably via the inlet I which receives the water from the second reactor R2.

The durations and temperatures of the operations of oxidation, of preparation of the solution of monomer Sm and of grafting depend on the article to be treated and on the desired degree of grafting. By way of indication, the temperature of the solution of monomer Sm in the second reactor R2 may be of the order of 40° C. to 80° C. and the temperature of the ozonated water in the first reactor R1 may be of the order of 20° C. to 40° C.

Because of the invention, articles can be oxidized and grafted industrially in one and the same reactor R1. Advantageously, it is possible to reduce the duration of the treatment while controlling it perfectly, by preparing the solution of monomer Sm in a second dedicated reactor R2 mounted upstream of the first reactor R1.

The invention claimed is:

1. An oxidation and grafting method for grafting a bioactive polymer onto an article, the method comprising a step of oxidizing the article by ozonation and a step of grafting the bioactive polymer on the article by radical polymerization in a polymerization station comprising a first reactor,
   wherein the two steps for oxidation and grafting are carried out consecutively in different solutions in the first reactor of the polymerization station.

2. The method as claimed in claim 1, in which the first reactor comprises:
   a first tank for receiving the article for oxidizing and grafting,
   a first cover which is mounted in a fluid-tight manner on the first tank,
   an inlet for at least partially filling the first tank in order to immerse the article, and
   a first drain outlet for draining the first tank,
   an ozone inlet for generating ozone bubbles in the first tank with the aim of oxidizing the surface of the article immersed in water, and
   a monomer solution inlet for at least partially filling the first tank with monomer solution in order to immerse the article in the monomer solution.

3. The method as claimed in claim 2, in which the first tank comprises a first double wall in a manner such as to define a peripheral circuit for circulating a heat transfer fluid with the aim of heating the contents of the first tank to a predetermined temperature.

4. The method as claimed in claim 3, wherein the heat transfer fluid is oil.

5. The method as claimed in claim 1, in which the step for grafting by radical polymerization comprises preparing an aqueous solution of monomer in a second reactor of the polymerization station connected in series upstream of the first reactor in order to be able to decant the aqueous solution of monomer from the second reactor into the first reactor.

6. The method as claimed in claim 5, in which the second reactor comprises:

a second tank which is intended to be at least partially filled with a monomer solution, a second cover which is mounted in a fluid-tight manner on the second tank, a second drain outlet connected to a monomer solution inlet of the first reactor in order to drain the monomer solution from the second reactor into the first reactor.

7. The method as claimed in claim 6, in which the second tank comprises a second double wall in a manner such as to define a peripheral circuit for the circulation of a heat transfer fluid with the aim of heating the monomer solution of the second tank to a predetermined temperature.

8. The method as claimed in claim 7, wherein the heat transfer fluid is oil.

9. The method as claimed in claim 5, in which the first and second reactors are maintained under pressure by injecting an inert gas.

10. The method as claimed in claim 9, wherein the inert gas is argon.

11. The method as claimed in claim 5, in which the step for oxidation by ozonation comprises at least partially filling the first reactor with water deriving from the second reactor.

12. The method as claimed in claim 1, wherein the article is a polymer or ceramic article.

\* \* \* \* \*